United States Patent [19]
Oviatt

[11] Patent Number: 5,720,125
[45] Date of Patent: Feb. 24, 1998

[54] THROWAWAY MOUSETRAP FOR CATCHING MICE LIVE

[76] Inventor: Bill Oviatt, 177 N. 3 St., Lander, Wyo. 82520

[21] Appl. No.: 632,332

[22] Filed: Apr. 17, 1996

[51] Int. Cl.⁶ .................................................. A01M 23/08
[52] U.S. Cl. ............................................................ 43/61
[58] Field of Search ................................ 43/60, 61, 75, 43/66

[56] References Cited

U.S. PATENT DOCUMENTS

| | | | |
|---|---|---|---|
| 1,226,641 | 5/1917 | Cushing | 43/60 |
| 1,581,297 | 4/1926 | Schmuck | 43/60 |
| 1,703,990 | 3/1929 | Daniels | 43/61 |
| 2,475,462 | 7/1949 | Rosen | 43/61 |
| 2,485,319 | 10/1949 | Rosen | 43/61 |
| 2,655,759 | 10/1953 | Cronberger | 43/60 |
| 2,885,820 | 5/1959 | Maggio | 43/61 |
| 4,550,523 | 11/1985 | Spiller | 43/61 |
| 4,566,218 | 1/1986 | Kurosawa | 43/61 |
| 4,578,892 | 4/1986 | Melton | 43/61 |
| 4,768,305 | 9/1988 | Sackett | 43/61 |
| 5,452,539 | 9/1995 | Kurosawa | 43/61 |
| 5,502,918 | 4/1996 | Oviatt | 43/61 |
| 5,564,221 | 10/1996 | Henriques | 43/61 |

*Primary Examiner*—Kurt Rowan
*Attorney, Agent, or Firm*—Rick Martin

[57] ABSTRACT

A disposable mousetrap consists of a clear plastic tube having a fulcrum centrally located on the tube. Bait is placed at the bait end of the tube. The opposite end of the tube has a mouse entrance. When the mouse enters the mouse entrance he causes the tube to teeter downward at the bait end. A ping pong ball then rolls to close the mouse entrance. A hinged wedge locks the ping pong ball in place. A fulcrum rod is then snapped off. The rod is inserted into the hinged wedge and tube, thereby permanently trapping the mouse. The trap is then disposed as hazardous waste.

6 Claims, 3 Drawing Sheets

THROWAWAY MOUSETRAP FOR CATCHING MICE LIVE

FIELD OF INVENTION

The present invention relates to a better mousetrap especially suited for commercial use where mice body fluids pose a health hazard.

BACKGROUND OF THE INVENTION

Mice can be a nuisance and/or a health menace. Traditional mousetraps are comprised of either a mechanical or chemical killing means. When a mouse is killed in a restaurant or in a household, many health problems can arise. These health problems include the release of body fluids containing viruses inside the household. Parasites including worms or lice can be released. Decomposition bacteria will cause odors and cause injury to pets or children who ingest them. Health standards require decontamination of large areas of restaurants and parking lots where rodent body fluids have been released.

The present invention eliminates these hazards by catching the mouse alive. A simple, cylindrical, teeter-totter contains bait at a closed end of the cylinder and walks toward the bait. As the mouse passes a fulcrum the cylinder tilts the bait end of the cylinder downward. The mouse becomes trapped by a ping pong ball which rolls toward the fulcrum to trap the mouse. The trap containing the trapped mouse can be quickly sealed by a locking pin. The mousetrap and mouse can then be put into the hazardous waste bin.

SUMMARY OF THE INVENTION

The main object of the present invention is to trap a mouse alive in a disposable trap.

Another object of the present invention is to provide an inexpensive trap.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
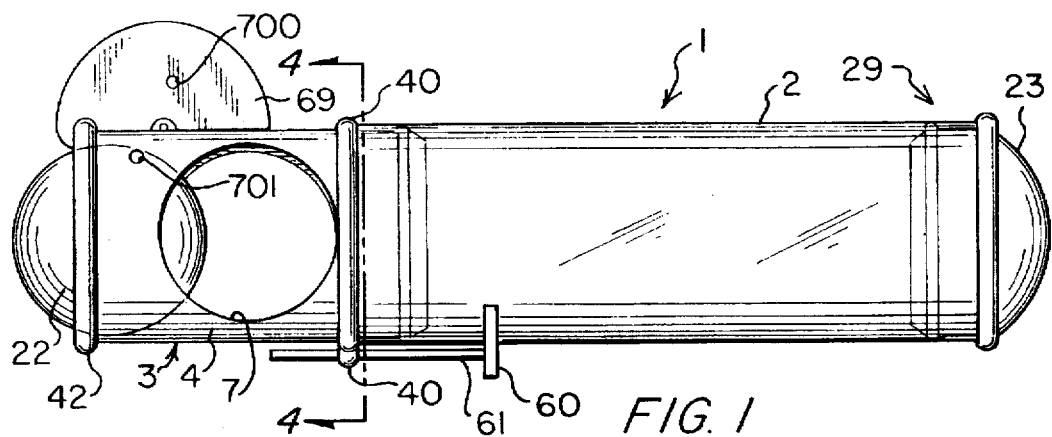
FIG. 1 is a side plan view of the preferred embodiment in a neutral position.
Figure 2:
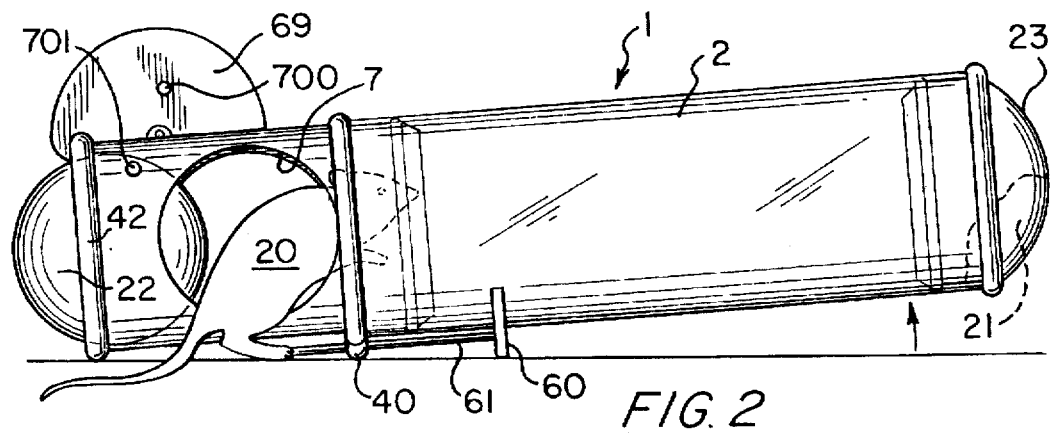
FIG. 2 is a side plan view of the preferred embodiment in the loaded position.
Figure 3:
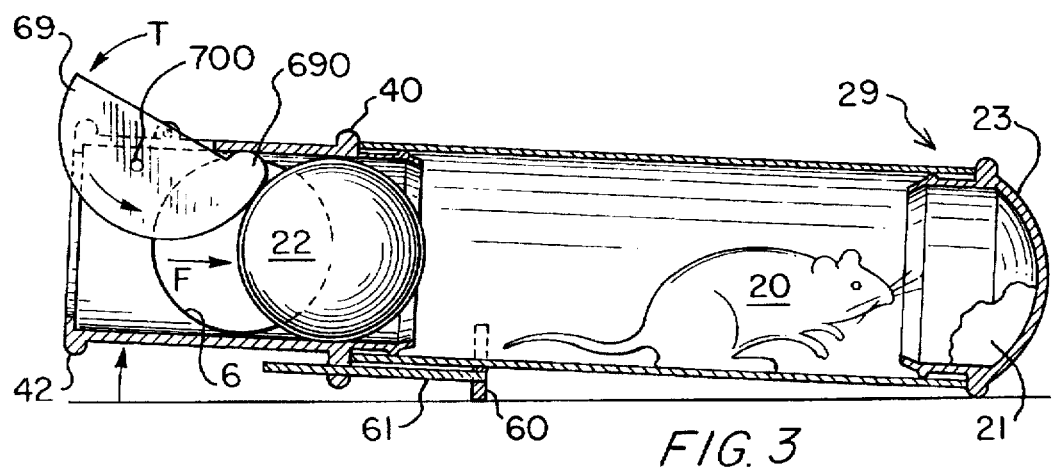
FIG. 3 is a side plan view of the preferred embodiment in the trapped position.
Figure 4:
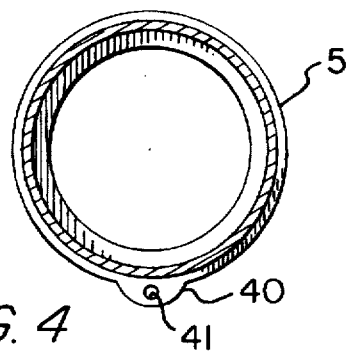
FIG. 4 is a front plan view of the fulcrum support collar.
Figure 5:
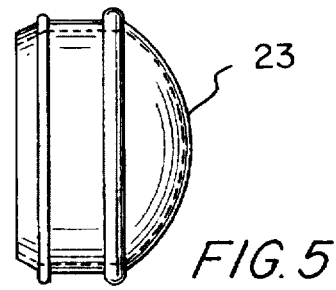
FIG. 5 is a side plan view of the end cap.
Figure 6:
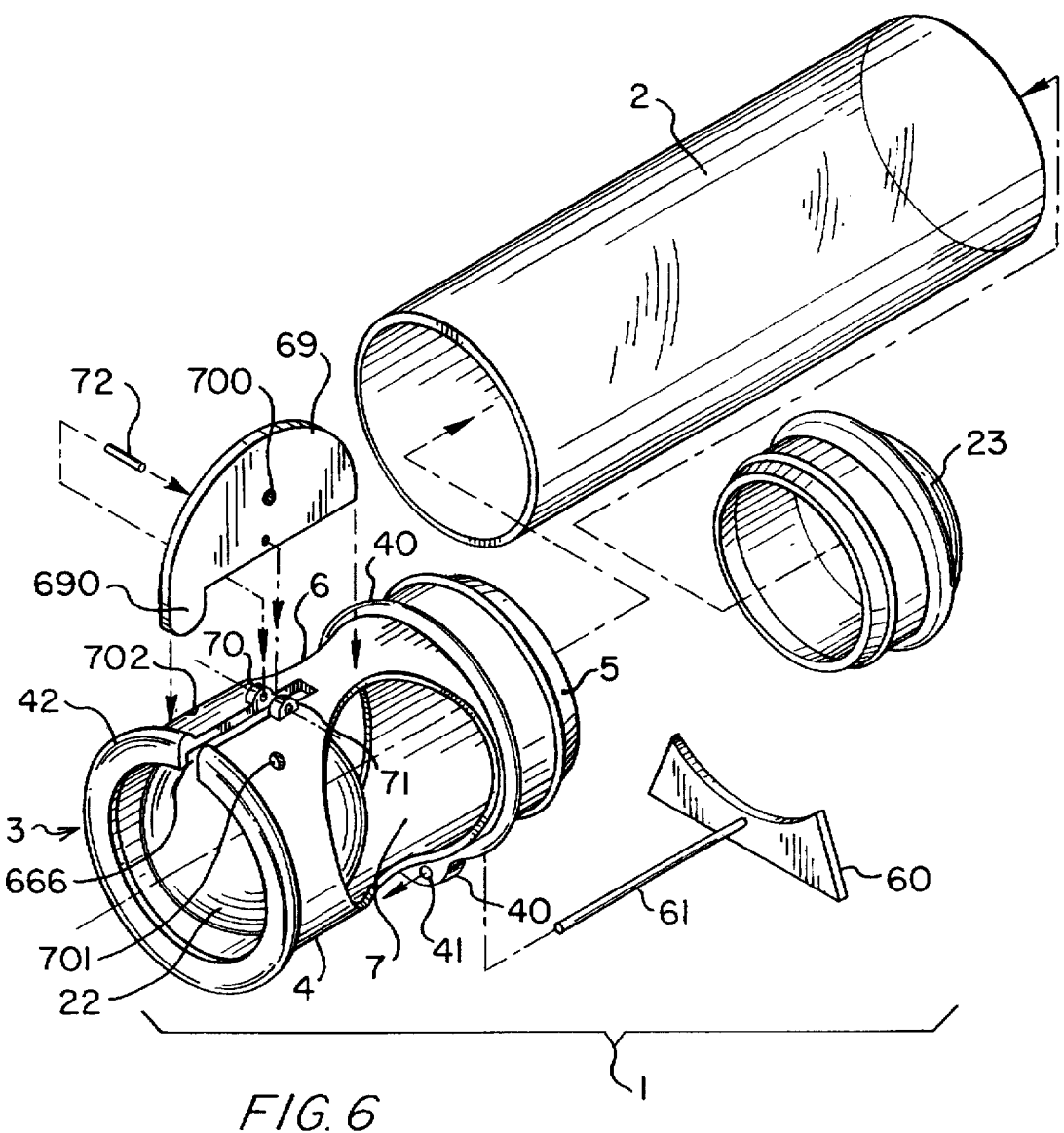
FIG. 6 is an exploded view of the preferred embodiment.

Referring first to FIGS. 1, 6 the trap 1 is comprised of a cylinder 2 preferably made from clear cylindrical body 4. A connector 5 mounts the capture module 3 inside the cylinder 2. This is merely a best mode manufacturing design. A single piece mold would be an equivalent. Entrance portals 6, 7 allow the mouse 20 to enter the trap as shown in FIG. 2. The mouse 20 is attracted to the bait 21 at bait end 22 of cylinder 2. A cap 23 holds the bait 21 inside the cylinder 2 and traps the mouse 20 as shown in FIG. 3. Although the cap 23 is shown as removable to load the bait 21, a manufacturing design choice would include a pre-molded cap. The bait could be loaded via the entrance portals 6, 7.

The capture mechanism consists of the teeter tottering (pivoting) of the cylinder 2 around the fulcrum 60. The fulcrum 60 is supported by a rod 61 which is slidably adjustable in hole 41 of collar 40. A ping pong ball 22 rolls inside the capture module 3 between collars 40 and 42. Collars 40, 42 act as stops.

FIG. 2 shows the trap 1 in the loaded position wherein the capture module 3 is on the ground, and the bait end 22 is in the air. The ping pong ball 22 is resting against the collar 42. The locking disc 69 is in the cocked position. It is supported by nubs 70, 71, and axle 72. Locking disc 69 has a protuberance 90 to assist in the trapped mode as depicted in FIG. 3. The locking disc 69 pivots inside the slot 666. It acts as a pivoting wedge. In the trapped mode, the ping pong ball 22 has rolled forward as shown by arrow F. It is resting against collar 40. The cylinder 2 has pivoted to the trapped position with the bait end 22 on the ground due to the weight of the mouse 20.

The locking disc 69 has rotated in direction T due to gravity. The locking disc 69 having the protuberance 690 rests against the ping pong ball 22, thereby locking it against the collar 40.

Figure 7:
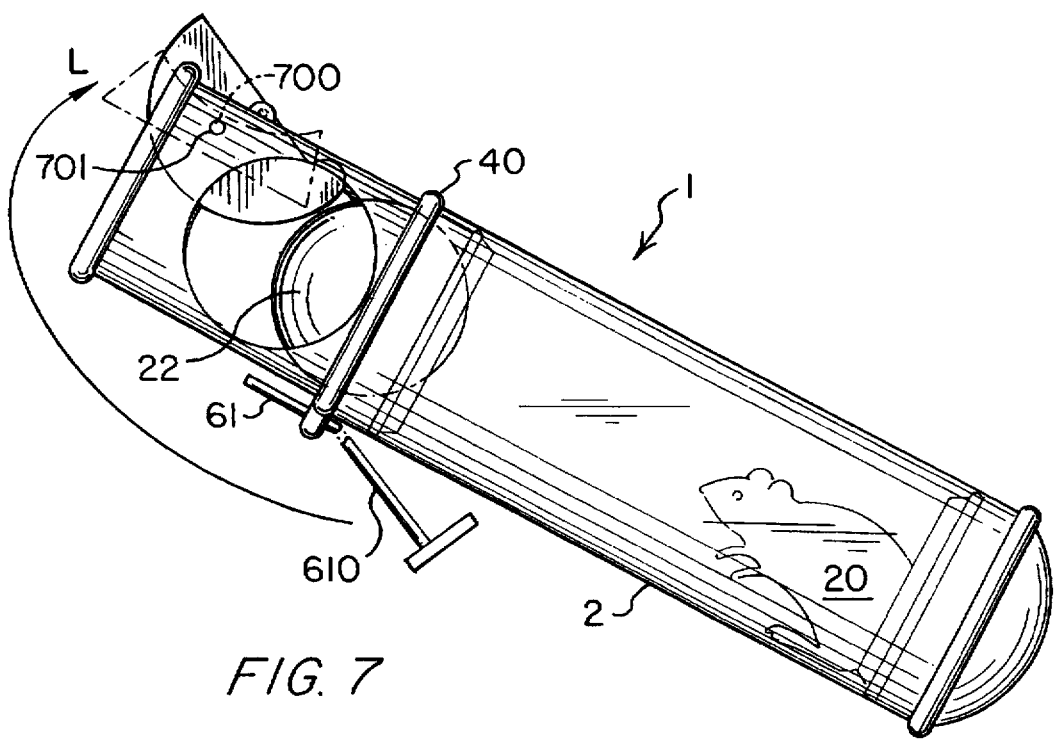
FIG. 7 is a side plan view of the locking pin being separated from the preferred embodiment.
Figure 8:
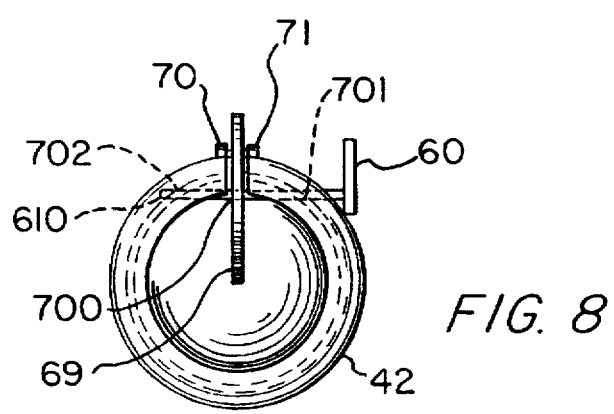
FIG. 8 is a front plan view of the preferred embodiment with the locking pin in place.

Referring next to FIGS. 7, 8 the rod 61 is now snapped off to create a locking pin 610 as shown. Locking pin 610 is then inserted into holes 700, 701, 702 as shown by arrow L. The mouse 20 is now permanently trapped inside the trap 1. The trap 1 can be disposed of in a hazardous waste disposal area.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A disposable trap functioning to capture a rodent alive, the trap comprising:
    a cylinder balanced on a fulcrum which is supported on a support surface;
    said cylinder further comprising a first end having a capture module and a second bait end; and
    said capture module further comprising a rodent entrance, a ball and a pivoting locking means functioning to lock the ball in the cylinder after the rodent enters the rodent entrance, walks to the second bait end, thereby causing the cylinder to tilt to a trapped mode with the second end resting on the support surface, wherein the pivoting locking means further comprises a hinged member which urges the ball against a stop when the trap is in the trapped mode, and wherein the ball further comprises a ping pong ball, the stop further comprises a collar around the cylinder, and the hinged member further comprises a semicircular disc mounted in a slot atop the cylinder.

2. A rodent trap comprising:
    a fulcrum resting on a support surface, wherein the fulcrum further comprises a means for adjustment functioning to provide for a variable weight bait, and wherein the means for adjustment further comprises a rod mounted in a collar on the tube;

a tube balanced on the fulcrum;

said tube having an entrance end and a bait end, wherein the trap has a loaded mode when the entrance end rests on the support surface, and a trapped mode when the bait end rests on the support surface; and said entrance end further comprising a rodent entrance and a means for trapping the rodent functioning to trap the rodent inside the tube when the rodent walks to the bait end, thereby tilting the tube to the trapped mode.

3. The trap of claim 2, wherein the means for trapping the rodent further comprises a ball rolling between two stops on the tube and a pivoting wedge.

4. The trap of claim 3, wherein the pivoting wedge further comprises a semi-circular disc hinged inside a slot atop the tube.

5. The trap of claim 4, wherein the fulcrum further comprises a snap off rod which functions to permanently secure the semi-circular disc.

6. A disposable trap functioning to capture a rodent alive, the trap comprising:

a cylinder balanced on a fulcrum which is supported on a support surface;

said cylinder further comprising a first end having a capture module and a second bait end; and said capture module further comprising a rodent entrance, a ball and a pivoting locking means functioning to lock the ball in the cylinder after the rodent enters the rodent entrance, walks to the second bait end, thereby causing the cylinder to tilt to a trapped mode with the second end resting on the support surface, wherein the fulcrum further comprises an adjustment means functioning to balance the cylinder with varying amounts of bait, and wherein the adjustment means further comprises a rod on the fulcrum and a collar having a hole for the rod.

* * * * *